United States Patent [19]
Knio

[11] Patent Number: 5,970,886
[45] Date of Patent: Oct. 26, 1999

[54] CUSHIONED PALLET UTILIZING INTERCONNECTING REUSABLE COMPONENTS

[75] Inventor: Imad M. Knio, Raleigh, N.C.

[73] Assignee: Northern Telecom Limited, Canada

[21] Appl. No.: 08/998,645

[22] Filed: Dec. 29, 1997

[51] Int. Cl.[6] .................................................. B65D 19/38
[52] U.S. Cl. ...................................................... 108/57.12
[58] Field of Search ............................ 108/51.12, 51.11, 108/56.3, 55.1; 248/560, 615, 636, 638

[56] References Cited

U.S. PATENT DOCUMENTS

| | | | |
|---|---|---|---|
| 3,090,331 | 5/1963 | McCann | 108/57.12 |
| 3,101,063 | 8/1963 | Wharton | 108/57.12 |
| 3,330,521 | 7/1967 | Whirlein | 108/57.12 X |
| 5,195,439 | 3/1993 | Harder | 108/57.12 |
| 5,588,371 | 12/1996 | Looker | 108/57.12 |

FOREIGN PATENT DOCUMENTS

| | | | |
|---|---|---|---|
| 2380191 | 10/1978 | France | 108/57.12 |
| 2231552 | 11/1990 | United Kingdom | 108/56.3 |

*Primary Examiner*—Jose V. Chen
*Attorney, Agent, or Firm*—Finnegan, Henderson, Farabow, Garrett & Dunner, L.L.P.

[57] ABSTRACT

A cushioned pallet that includes a base support with interlocking reusable corner support assemblies. The interlocking reusable corner support assemblies are preformed and removably secure to the base. A cushioned pallet that includes a base support with interlocking reusable corner support assemblies and center support assemblies. A cushioned pallet that includes a base support with corner support assemblies, center support assemblies, vertical support members and a top cap with corner support assemblies. The various components of the cushioned pallet are preformed and removably connect to each other to reduce the number of parts, ease assembly and disassembly, and allow the cushioned pallet to be reused many times.

20 Claims, 10 Drawing Sheets

CUSHIONED PALLET UTILIZING INTERCONNECTING REUSABLE COMPONENTS

BACKGROUND OF THE INVENTION

The present invention relates generally to a cushioned pallet, and more particularly, to a cushioned pallet that utilizes interconnecting reusable components. These components can readily be snapped together and apart for easy assembly, disassembly, and reuse of the pallet. Moreover, the components are made of materials sufficient to withstand the forces associated with the shipping of heavy but sensitive electronics equipment.

Pallets are routinely employed in the shipping and handling of products. The shipping and handling of communications equipment and computers, however, often requires special features for pallets due to their large size and heavy weight. These products are transported on pallets usually by forklift from an assembly line to a warehouse for storage, from the warehouse to a truck for transportation, and from the truck to its final destination for installation.

Figure 1:
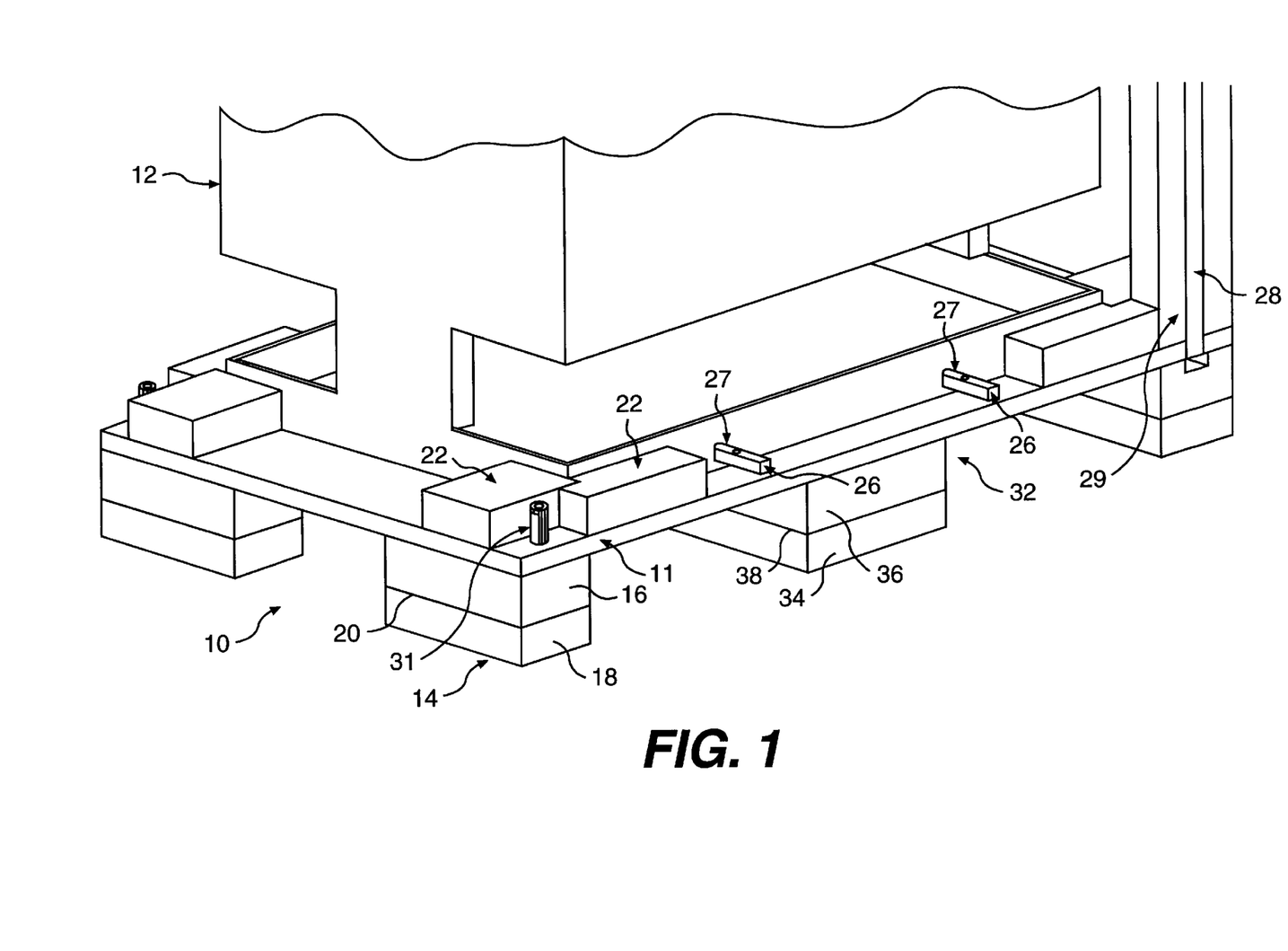
FIG. 1 is a perspective view of the lower half of a conventional cushioned pallet.

Jostling these products during shipping or storage can damage the sensitive components. Accordingly, pallets with shock absorbing and anti-vibration cushioning and protective coverings are used in the communications equipment and computer industries. FIG. 1 shows a conventional cushioned pallet 10 for use in the storage and transport of a load 12, such as a heavy but sensitive piece of communications equipment. The base 11 of cushioned pallet 10 includes a sheet of plywood of suitable thickness and size to support the load 12. At each corner of cushioned pallet 10 on the underside of the pallet is a corner support 14. Corner support 14 comprises a top piece of foam 16, which provides cushioning and dampening for the load 12, and a bottom piece of wood 18, which impacts with the ground. The foam 16 and wood base 18 are held together by glue 20.

On the top side of each corner of cushioned pallet 10 are two wood corner supports 22. Wood corner supports 22 help secure load 12 in place on base 11. Wood corner supports 22 are held in place on base 11 by nails (not shown). Load 12 is also held in place on base 11 by a pair of metal connects 26. Metal connects 26 are made from steel tubing. Metal connects 26 pass through pre-existing holes 27 in the base of the frame of load 12 and are then secured to base 11 by bolts and nuts, which are embedded in the wood base. The embedded nut have been known to fall off.

Cushioned pallet 10 also includes a vertical support 29, usually a two-by-four, positioned at each corner. FIG. 1 shows only one vertical support 29. The vertical supports 29 connect to a top cap (not shown) The top cap typically is a sheet of wood covering the top of load 12. Pins 31, which protrude from base 11, hold vertical supports 29 in place at each corner of cushioned pallet 10. Pins 31 fit into corresponding holes drilled in the ends of vertical supports 29. Base 11, vertical supports 29, and the top cap are held together by a pair of steel bands 28, only one of which is shown in FIG. 1. Steel band 28 passes through a notch at the top of foam cushion 16, along vertical support 29 and around the top cap.

Finally, further support and cushioning is provided for the conventional cushioned pallet 10 by a pair of center supports 32, only one of which is shown in FIG. 1. The pair of center supports 32 is fixed on the underside of base 11, one along the front face and one along the back face. Each center support 32 consists of a wood base 34 and a foam cushion 36. As with the corner supports 14, the wood base 34 and foam cushion 36 are glued together at seam 38.

While conventional cushioned pallets such as pallet 10 adequately protect sensitive electronics and communications equipment, they have several drawbacks. First, conventional cushioned pallets are comprised of a substantial number of parts that must be bolted, nailed or glued together, which require extensive labor to assemble and are expensive. Many parts, such as screws, bolts, nuts, washers and nails are required for assembly. Moreover, as noted above, the embedded nuts used to secure the metal connects have been known to fall off, causing farther delay and increased expense.

Second, the metal straps or bands, such as 28 in FIG. 1, that run between the top cap and the base sheet and hold the assembly together can be dangerous. When finally installed, these straps are under substantial tension. When the straps are cut to remove the pallet, the tension is released and a loose strap may injure the user. Injury can also occur when the user installs the straps around the pallet and introduces the tension to the straps. Installers at a job site also face problems in discarding the numerous metal bands associated with an installation.

Third, the combination of metal straps, wood components, and numerous parts results in increased weight for conventional pallets. This increased weight results in higher shipping costs.

Conventional cushioned pallets have an additional drawback in that they typically are not reused. For example, once the numerous pieces of the conventional cushioned pallet are secured together it is difficult to take them apart for future use. Various parts of the conventional cushioned pallets also become bent or broken during use. Repairing such pallets proves too costly, and the pallets are simply discarded. In fact, only about 30% of conventional pallets are reused. Conventional cushioned pallets, therefore, require the costly repurchase of materials and result in increased waste.

Yet another problem associated with conventional pallets is that they are not environmentally friendly. As noted above, the majority of conventional pallets are not reused. Those that are reused may only be reused once or twice before being discarded. Moreover, as noted existing pallets combine numerous parts with glue, screws and nails. As a result, conventional pallets are too costly to disassemble. They also cannot simply be ground for recycling because each pallet consists of a number of different materials. Consequently, conventional pallets are sent to landfills.

In an effort to address some of these problems, engineers have attempted to reduce the number of bolts, nuts, screws and washers utilized in conventional pallets. The pallets, however, were found not to be as sturdy and reliable. Engineers attempted to replace the steel banding with plastic bands. The plastic bands, however, were not strong enough and failed. Also, in the high temperature environment not uncommon in shipping, the plastic bands stretched.

In light of the foregoing, a need exists for a cushioned pallet for use in storing and transporting sensitive electronic equipment that has a reduced number of components, an increased level of safety in assembly and disassembly, a decreased cost, and reusable components as compared with prior arrangements.

SUMMARY OF THE INVENTION

Accordingly, the present invention is directed to a cushioned pallet that substantially obviates one or more of the limitations and disadvantages of the described prior arrangements. The present invention addresses the above problems in a cushioned pallet by using, in the preferred aspect, special molded plastic components that snap into place on an existing plywood base and top cap to provide cushioning and to secure the assembly together. These molded plastic pieces can also be readily snapped apart for easy disassembly and reassembly. Moreover, these molded plastic pieces are comprised of a plastic that can withstand the forces associated with the shipping of heavy but sensitive electronics equipment.

Additional objects and advantages of the invention will be set forth in part in the description that follows, and in part will be obvious from the description, or may be learned by practice of the invention.

In accordance with the invention as embodied and broadly described herein, the present invention in one aspect includes a cushioned pallet having a wood base sheet with holes to receive interlocking cushioning and locking components, a wood top sheet with holes to receive interlocking locking components, vertical wood supports notched to be secured in place, corner floor supports which interlock to the wood base sheet through the holes, secure the vertical supports to the wood base sheet, and contain dampening material, center floor supports which interlock to the wood base sheet through the holes and contain dampening material, and top corner supports which interlock to the wood top sheet through the holes.

In accordance with the invention as embodied and broadly described herein, the present invention in one aspect includes a cushioned pallet having a wood base sheet with holes to receive interlocking cushioning and locking components, corner floor supports which interlock to the wood base sheet through the holes and contain dampening material, and center floor supports which interlock to the wood base sheet through the holes and contain dampening material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention.

FIG. 6 is a perspective view of the underside of a top locking plate as shown in FIG. 15.

DETAILED DESCRIPTION OF THE PREFERRED EMBODIMENT

The following detailed description of the invention refers to the accompanying drawings. The same reference numbers identify the same or similar elements wherever possible.

The description includes exemplary embodiments, other embodiments are possible, and changes may be made to the embodiments described without departing from the spirit and scope of the invention. The following detailed description does not limit the invention. Instead, the scope of the invention is defined only by the appended claims.

Figure 2:
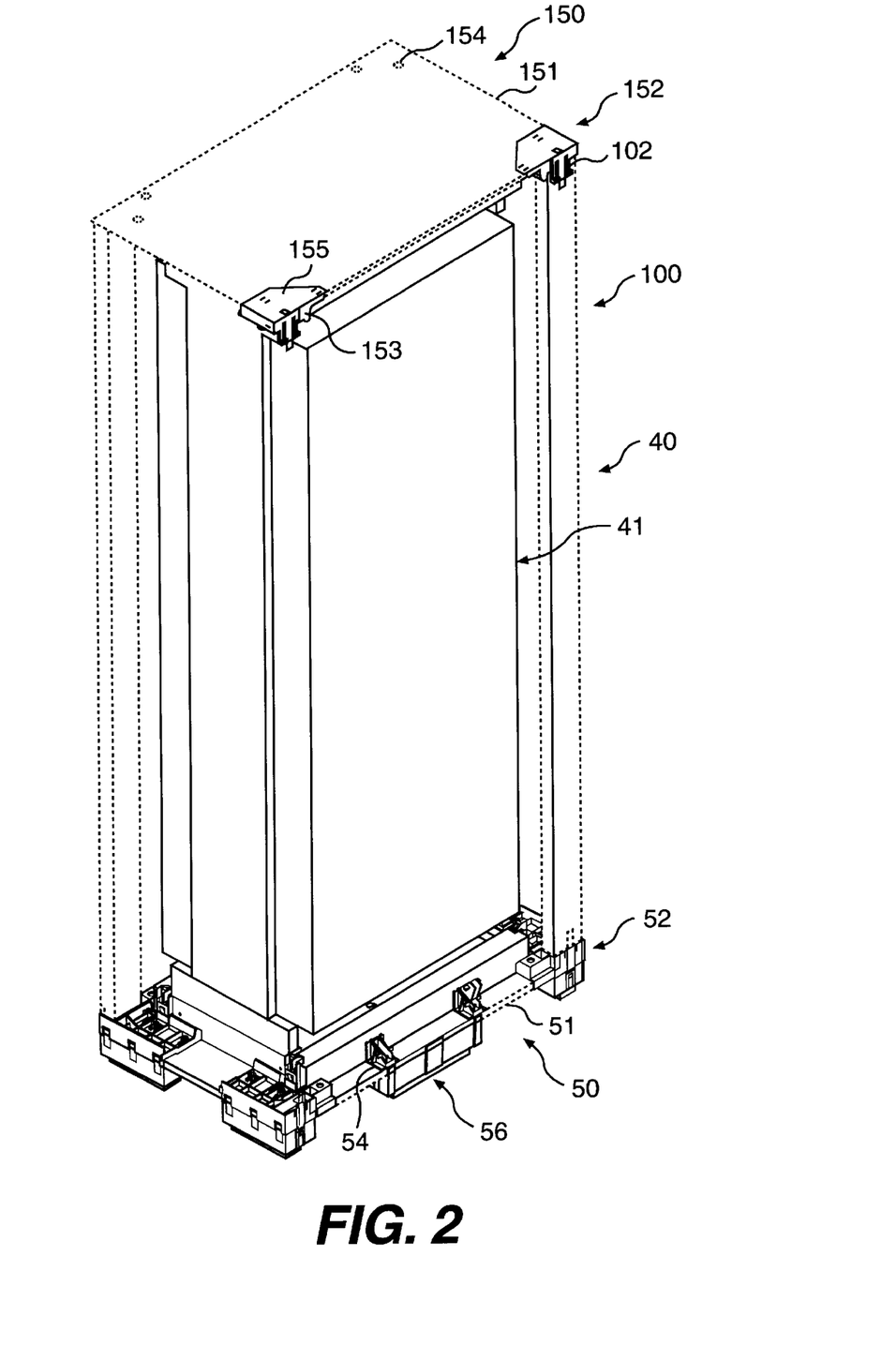
FIG. 2 is a perspective view of an assembly of a cushioned pallet in accordance with an embodiment of the present invention with several parts removed for clarity as indicated.

FIG. 2 shows a preferred embodiment of cushioned pallet 40 consistent with the present invention. Cushioned pallet 40 may comprise a base support 50, vertical supports 100, and a top cap 150. Those of ordinary skill in the art will readily recognize that the pallet of the present invention may be used with the base support 50 alone. Load 41 rests on base support 50. Load 41 may comprise computer equipment or any vibration and/or shock sensitive piece of equipment.

In the particular embodiment shown in FIG. 2, base support 50 is comprised of base 51, preferably made of an appropriate sheet of plywood. Use of plywood takes advantage of existing cushioned pallet bases. Base 51 may be any material suitable for supporting the weight of load 41, including, but not limited to, wood, metal, plastic or a composite. Base support 50 may also have four corner support assemblies 52 and one or more center floor support assemblies 56. Such supports are not required for practicing the invention but add to the performance of base support 50. In FIG. 2, base support 50 is shown in its preferred arrangement with a pair of center floor support assemblies 56 on the underside of base 51, one at the front side of base 51 and one on the back side (not shown). Center floor support assemblies 56 may also have one or more center frame locks 54, which may secure center floor support assemblies 56 to base 51 and help secure load 41 to base 51. As with center floor support assemblies 56, the cushioned pallet of the present invention may be used with or without center frame locks 54.

Cushioned pallet 40 is also shown in FIG. 2 with vertical supports 100. Vertical supports 100 are preferably comprised of appropriate lengths of two-by-four wood notched at each end to permit insertion into and connection with the respective corner support assemblies 52. Vertical supports 100, however, may be connected to corner support assemblies 52 by other connections. Vertical supports 100 protect load 41 from damage during transit and allow load 41 to be banded to the side of a shipping vehicle during transport. Due to shipping and storage requirements of particular loads, vertical supports may or may not be required. These notched vertical supports connected to corner support assemblies 52 replace, in part, the steel bands found to be problematic in conventional pallets.

Cushioned pallet 40 is also shown in FIG. 2, in a preferred aspect, with a top cap 150. Top cap 150 is, in turn, shown, in a preferred aspect, with four corner connectors 152.

Corner connectors 152 connect top cap 150 to vertical supports 100. Top cap 150 is comprised of a sheet of wood 151 or other physically supportive material of suitable size and thickness for the application. Top cap 150 has a series of positioning holes 154 drilled though the sheet of wood 151 through which corner connectors 152 attach to the sheet of wood 151.

Figure 3:
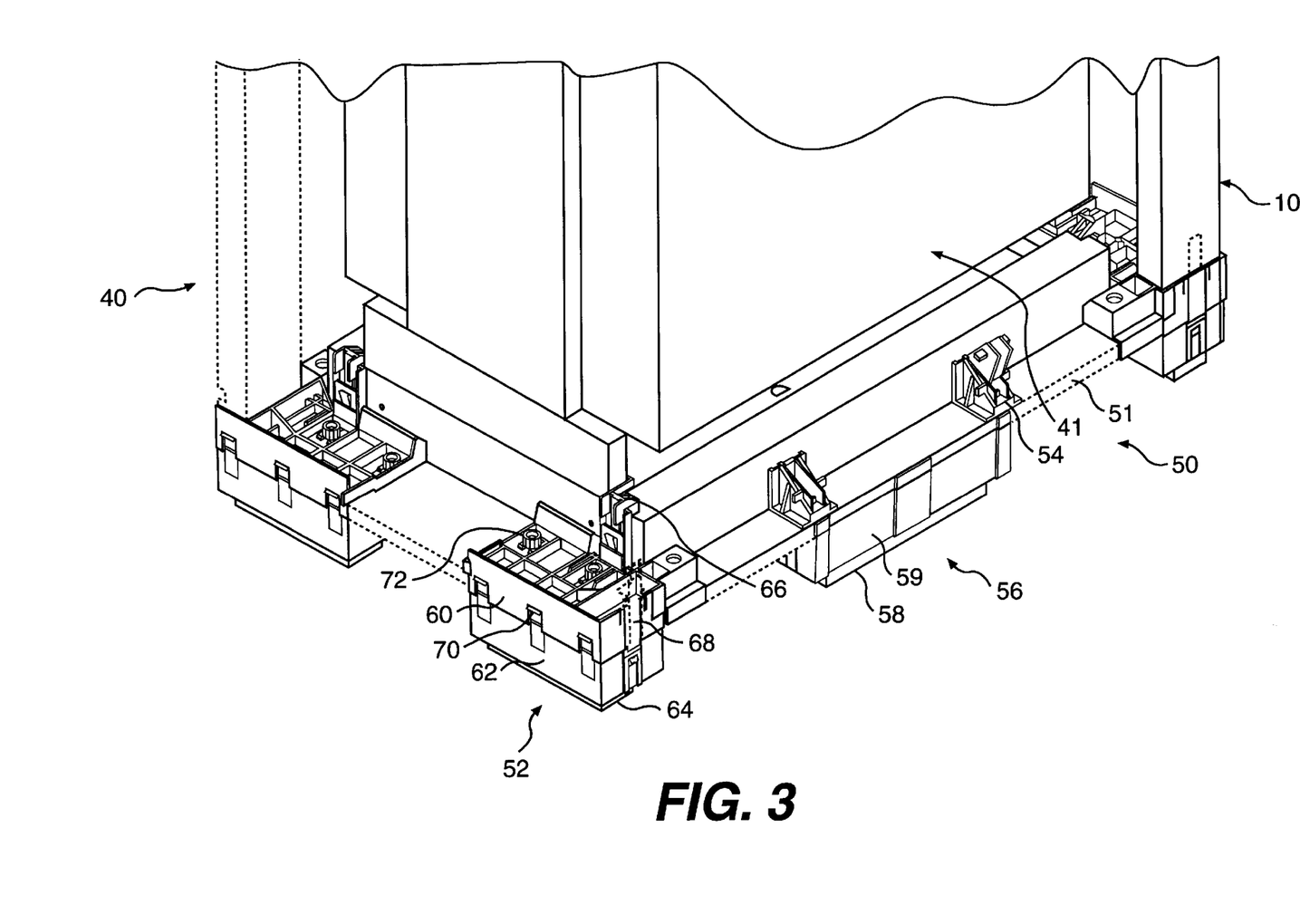
FIG. 3 is a perspective view of the lower half of the cushioned pallet of FIG. 2 with several parts removed for clarity as indicated.

In FIG. 3, base support 50 is shown in a preferred aspect with four corner support assemblies 52. Each corner support assembly 52 is comprised of a bottom corner lock plate 60, a bottom corner cup 62, and a bottom corner floor support 64. Bottom corner cup 62 has a molded vertical support lock 68, and a pair of undercut vertical dowels 72, which protrude through wood base 51. Bottom corner cup 62 also houses foam cushioning material (not shown). Conventional cushioning materials include plank polyethylene, expanded polystyrene, urethane or rubber. Other suitable materials appropriate for the particular cushioning and shock absorbing may be utilized.

The cushioning and dampening in the present invention could be achieved through the use of air, water, oil, or other similar material. The cavity formed in the bottom corner cup could be modified, for example, to receive an air bag.

Bottom corner lock plate 60 receives dowels 72 from bottom corner cup 62. Dowels 72 lock in place on bottom corner lock plate 60. Bottom corner lock plate 60 may also be secured to bottom corner cup 62 by way of center locks 70. These locking means secure the components of the corner support assembly 52 to each other and to the base sheet of wood 51. These locking means are also readily unlocked to allow the easy disassembly of the corner support assembly 52 for storage and future reassembly.

Bottom corner lock plate 60 may have a corner frame lock 66. Corner frame lock 66 can be molded separately from corner lock plate 60 in production. Corner frame lock 66 then helps secure load 41 to wood base 51 by snapping onto the base of the frame of load 41.

Base support 50 is also shown, in a preferred aspect, with one pair of center floor support assemblies 56. Each center floor support assembly 56 is comprised of a center floor support 58, a bottom center cup 59 and a pair of center frame locks 54. Center frame locks 54 secure bottom center cup 59 to wood base 51. Center frame locks 54 also help secure load 41 to wood base 51 by locking into preexisting holes in the base of the frame of load 41. Like corner support assemblies 52, center floor support assemblies 56 may readily be disassembled for storage and reassembly.

FIG. 3 also shows the connection of the vertical support 100 to corner support assembly 52. Vertical support 100 may be notched near its end as shown at 102 in FIG. 3. During assembly of cushioned pallet 40, vertical support 100 is introduced into corner support assembly 52. It is guided into corner support assembly 52 by the vertical walls of bottom corner cup 62. Notch 102 then engages a molded vertical support lock 68, locking into place. As will be more fully explained below, molded vertical support lock 68 rotates upward to engage vertical support 100 and hold vertical support 100 in place.

Figure 4:
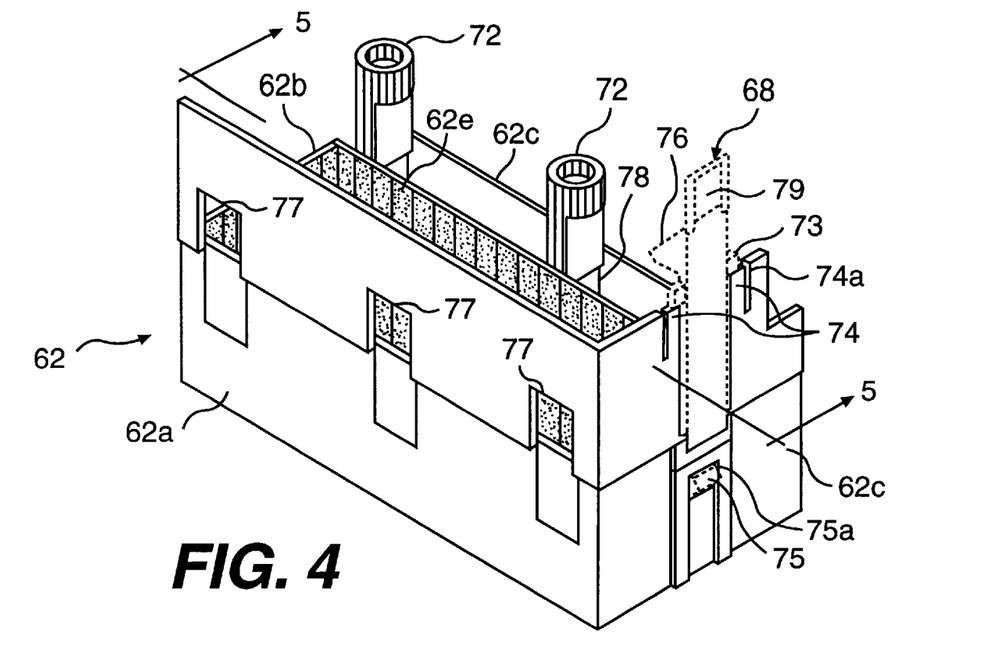
FIG. 4 is a perspective view of a bottom corner cup.

FIG. 4 shows an enlargement of bottom corner cup 62 in a preferred aspect. Bottom corner cup 62 may be comprised of four vertical walls 62*a*–d. Two of the walls 62*a* and 62*d* extend vertically an additional length beyond the remaining two walls 62*b* and 62*c*. Bottom corner cup 62 further includes two dowels 72, which are undercut to facilitate locking with bottom corner lock plate 60, which is shown in FIG. 3. Dowels 72 are preferably molded along with bottom corner cup 62 and are cylindrical in shape.

In a preferred embodiment, bottom corner cup 62 also has a molded vertical support lock 68. Molded vertical support lock 68 is comprised of an elongated plastic member with a pair of side winglets 73 at a position just over the top edge of the bottom corner cup 62. Side winglets 73 interact with vertical stops 74 of bottom corner cup 62 in such a way that molded vertical support lock 68 can be secured in its unlocked position for easier de-crating of load 41, shown in FIG. 3. That is, when molded vertical support lock 68 is maneuvered into its unlocked position, side winglets 73 impede molded vertical support lock 68 from simply snapping back into its locked position. The user, thereby, can unlock molded vertical support locks 68 one at a time. This feature further simplifies the use of the cushioned pallet of the present invention and also helps avoid the problems with conventional cushioned pallets associated with metal bands.

Vertical stops 74 are formed from the extended vertical wall 62*d* of bottom corner cup 62. Vertical stops 74 are slightly thinner than the remaining vertical wall 62*d* of bottom corner cup 62 and are separated from the remainder of the wall 62*d* by a vertical notch 74*a*, which extends down from the top of wall 62*d* but preferably does not reach the bottom of wall 62*d*.

Molded vertical support lock 68 also has a front cut-out 75 which provides additional support to molded vertical support lock 68 against pulling forces from the vertical support 100. Front cut-out 75 is formed as part of molded vertical support lock 68 and protrudes out of a corresponding hole 75*a* in the vertical wall 62*d* of bottom corner cup 62. These features assist in easy locking and unlocking of these molded plastic components.

To engage vertical support 100, molded vertical support lock 68 has a molded lip 76 with about a 5 degree under cut to provide hook action to the notch 102 in vertical support 100, shown in FIG. 3. Notch 102 is also cut at a corresponding angle as shown in FIG. 3.

Bottom corner cup 62 preferably has three side cutouts 77 in extended vertical wall 62*a*. The side cutouts 77 are square holes in the extended vertical wall 62*a*. These side cutouts 77 facilitate locking to the corner lock plate 60, shown in FIG. 3. Bottom corner cup 62 also preferably has an inner vertical wall 78 which defines with vertical walls 62*a*, 62*b* and 62*d* a compartment for containing a piece of foam or other cushioning material 62*e*. The inner compartment defined by walls 78 and remaining portions of walls 62*a*, 62*b* and 62*d* preferably excludes dowels 72.

A small square 79 is cutout of the top portion of molded vertical support lock 68. This square cutout 79 provides an opening whereby a staple or similar device can be used to further secure molded vertical support lock 79 to the vertical support 100, shown in FIG. 3.

Figure 5:
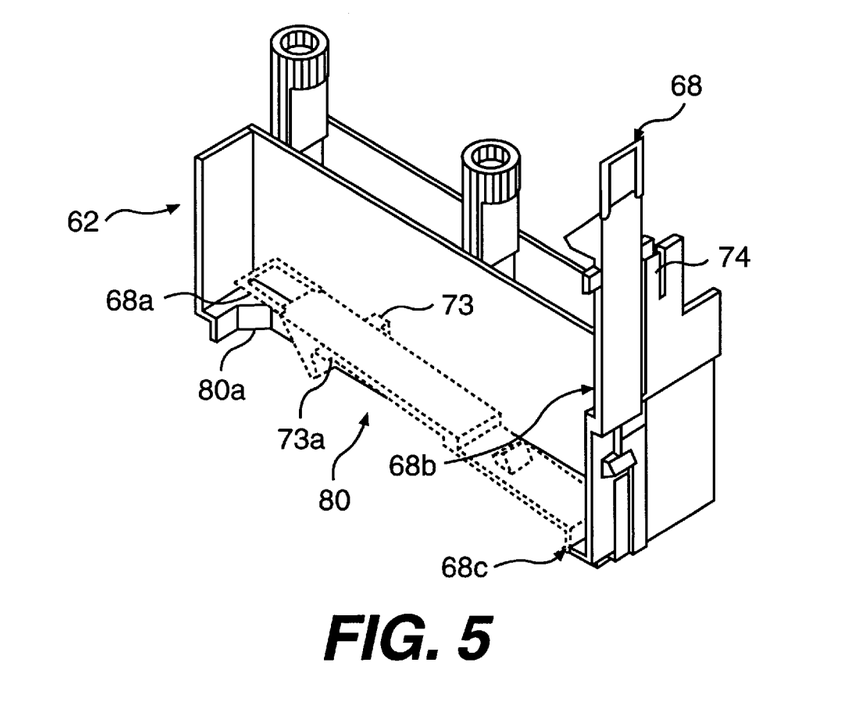
FIG. 5 is a perspective view of a cross-section of a bottom corner cup along 4—4 as indicated in FIG. 4.

FIG. 5 is a cross-sectional view of bottom corner cup 62 along axis 4—4. FIG. 5 shows molded vertical support lock 68 in two positions. First, molded vertical support lock 68 is shown by dotted lines (68*a*) as it exists just after being removed from a mold. Molded vertical support lock 68 is also shown by solid lines (68*b*) in its operational position.

Molded vertical support lock 68 is molded in this way to facilitate ease of tool making. It is connected to bottom corner cup 62 by a small live hinge 68*c*. Live hinge 68*c* allows molded vertical support lock 68 to be rotated from its molded position 68*a* to its operational position 68*b*. Assembly of the corner support assembly fixes molded vertical support lock 68 in its operational position 68*b*.

In FIG. 5, the cutout 80 in the bottom of bottom corner cup 62 is shown. Cutout 80 is preferably constructed with a rib perimeter 80a to provide strength to cutout 80. During installation, bottom corner floor support 64, shown in FIG. 3, is inserted into cutout 80. Foam cushioning or other material or means is then placed in on top of bottom corner floor support 64, shown in FIG. 3. Notches 73a, on the underside of side winglets 73, interact with vertical stops 74 and allow molded vertical support lock 68 to lock in the open position.

Figure 6:
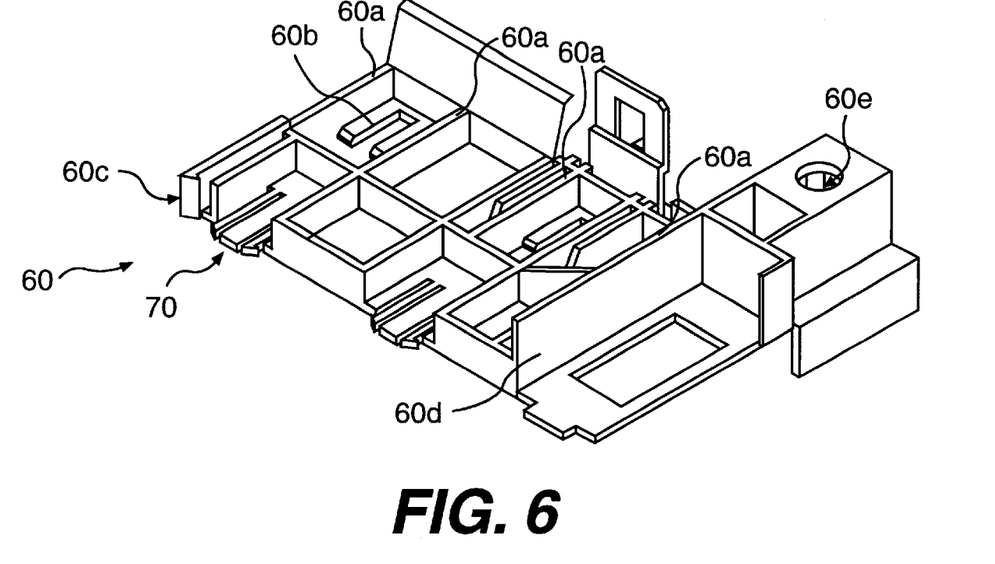
FIG. 6 is a perspective view of a bottom corner lock plate.

FIG. 6 shows a corner lock plate 60. Corner lock plate 60 is preferably formed by molding plastic. Corner lock plate 60 may be molded with several stiffening beams 60a for added strength. Corner lock plate 60 may also be molded with dowel locking slots 60b. Dowel locking slots 60b are square holes in the base of corner lock plate with further rectangular slots that mate with the undercuts in dowels 72, shown in FIG. 4. Corner lock plate 60 also has center locks 70, which are tongues extending beyond the edge of corner lock plate 60. The center locks 70 secure the corner lock plate 60 to the bottom corner cup 62, shown in FIG. 4. Corner lock plate 60 also preferably has a side locking latch 60c which is a live hinge on the stiffening beam at the edge of corner lock plate 60. Side locking latch 60c snaps around the edge of extended wall 62a in bottom corner cup 62, shown in FIG. 4. At the edge opposite the side locking latch 60c, corner lock plate 60 has vertical walls that define part of a recess 60d for the vertical support 100. Corner lock plate 60 also may have a hole 60e to secure the cushioned pallet to, for example, a dolly. If desired, a bolt could be passed through hole 60e and secured to a dolly or other transporting device.

Figure 7:
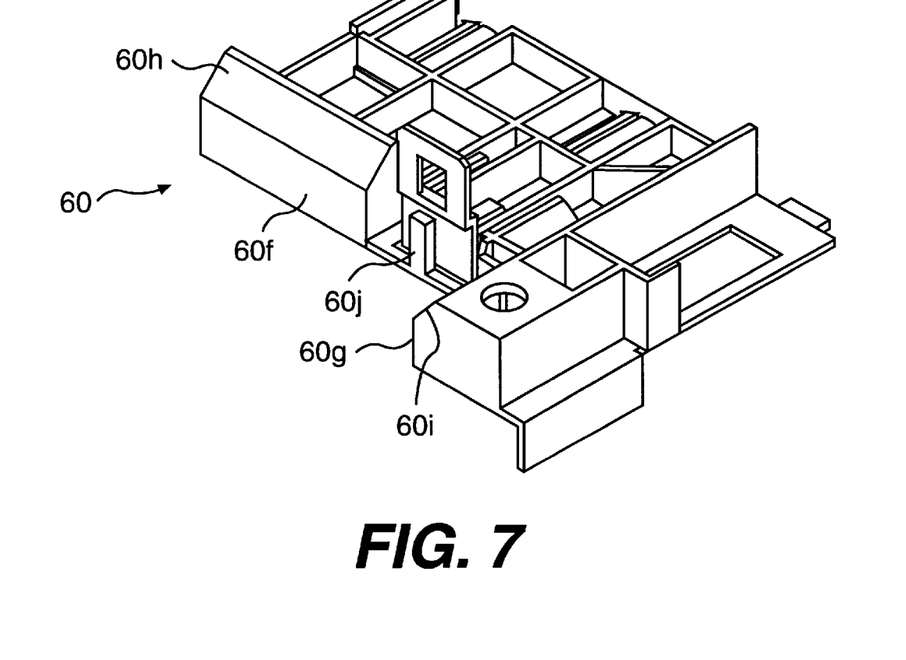
FIG. 7 is a perspective view of a bottom corner lock plate viewed from the backside of FIG. 6.

FIG. 7 again shows, in a preferred aspect, a corner lock plate 60 viewed from the backside of FIG. 6. On the internal edges 60f and 60g of corner lock plate 60, load 41, shown in FIG. 3, is preferably engaged. Edges 60f and 60g may be reinforced and beveled along their top edges 60h and 60i. Beveled edges 60h and 60i help guide load 41 into position during loading. Corner lock plate 60 may also contain a holding column 60j to secure corner frame lock 66, shown in FIG. 3, to corner lock plate 60. As can be seen from the figures, corner lock plate 60 serves, in its preferred embodiment, to support load 41 and secure the corner support assembly to the base sheet.

Figure 8:
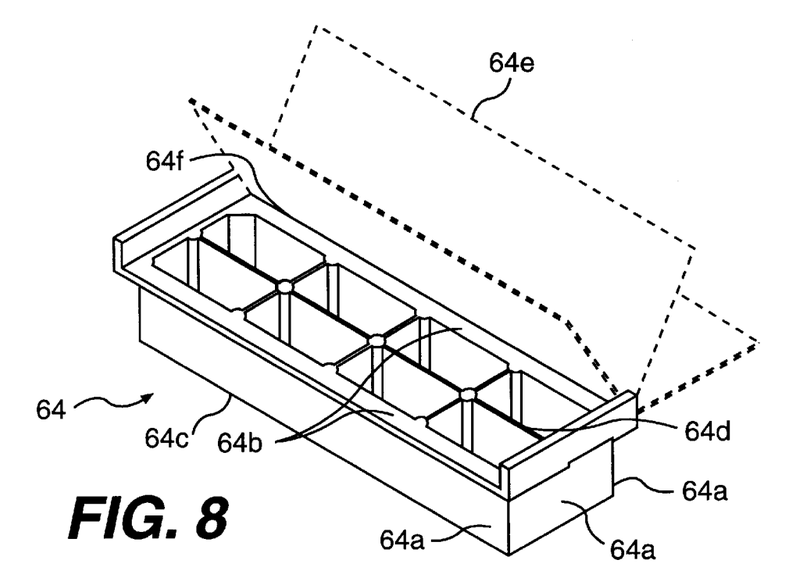
FIG. 8 is a perspective view of a corner floor support.

FIG. 8 shows a detailed view of bottom corner floor support 64. In a preferred aspect, bottom corner floor support 64 may be molded forming vertical walls 64a, ridges 64b around the top perimeter, floor contact surface 64c, stiffening ribs 64d, and lid 64e. Ridges 64b retain bottom corner floor support in bottom corner cup 62 when they come in contact with the inside ledge created by lower rib perimeter 80, shown in FIG. 5, of bottom corner cup 62. Lid 64e may be molded with a live hinge 64f, along one edge of ridge 64b. Prior to use, lid 64e can be folded to cover the top edge of stiffening ribs 64b. Cushioning foam of suitable stiffness is then inserted on top of closed lid 64e. In this preferred aspect, without lid 64e in place, the cushioning foam would compress into the spaced between the various stiffening ribs 64d. Corner floor support 64 in this preferred aspect impacts the floor and helps provide cushioning and dampening for the cushioned pallet of the present invention.

It should also be noted that the ability to simply place a piece of foam or other material on top of bottom corner floor support 64 or elsewhere in the present invention eliminates the need to pre-cut holes in the foam, as exists with conventional pallets, to allow bolts or screws to pass through. Accordingly, not only does this feature reduce assembly and disassembly time, it also reduces the cost.

Figure 9:
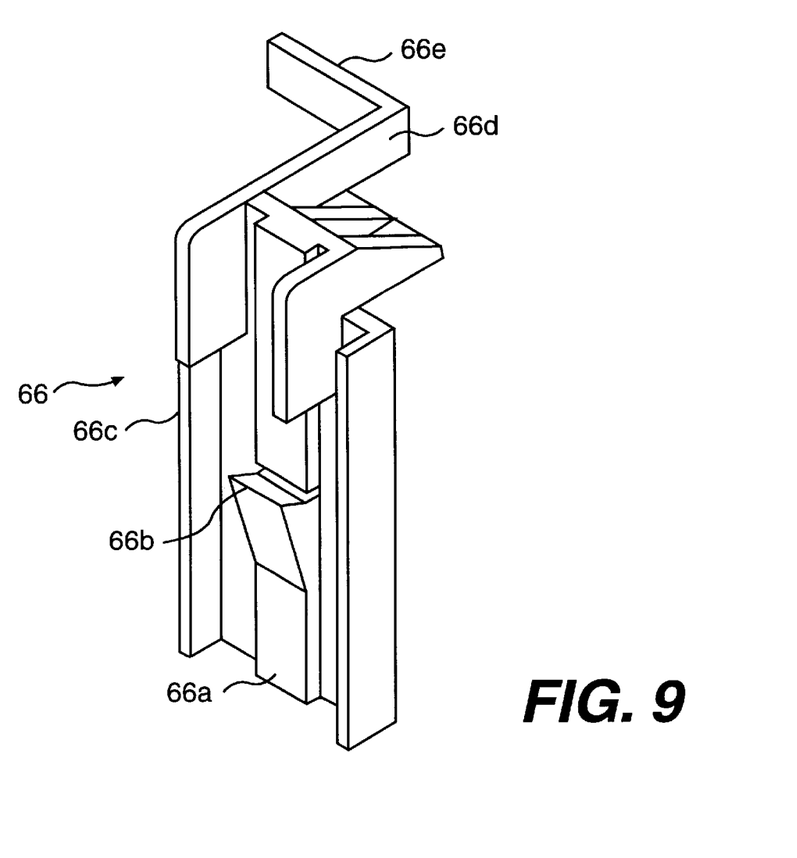
FIG. 9 is a perspective view of a corner frame lock.

FIG. 9 shows corner frame lock 66. Corner frame lock 66 can be molded separately from corner lock plate 60, shown in FIG. 3. Corner frame lock 66 is preferably a molded plastic elongated member with a stiffening beam 66a running up its middle. Approximately half way up corner frame lock may be a hook lock 66b to lock corner frame lock 66 to corner lock plate 60, as shown in FIG. 3. Corner frame lock 66 also has side guide supports 66c, which are ridges running along the outer edges of corner frame lock 66. Finally, corner frame lock 66 is molded to form both a horizontal frame support 66d and vertical hook support 66e to help hold load 41. Horizontal frame support 66d is a ridge on the face opposite to hook lock 66b. Vertical hook support 66e extends orthogonal to the end of horizontal frame support 66d in a plane parallel to the body of corner frame lock 66.

As explained above in connection with FIG. 2, in addition to corner support assemblies, the preferred aspect of the present invention is also provided with center floor support assemblies. Center floor support assemblies are fixed to wood base 51 on the front and rear faces of cushioned frame pallet 10 flush with the edge of wood base 51. These modular components provide additional cushioning and support for the load. They are also easily installed and removed for later use.

Figure 10:
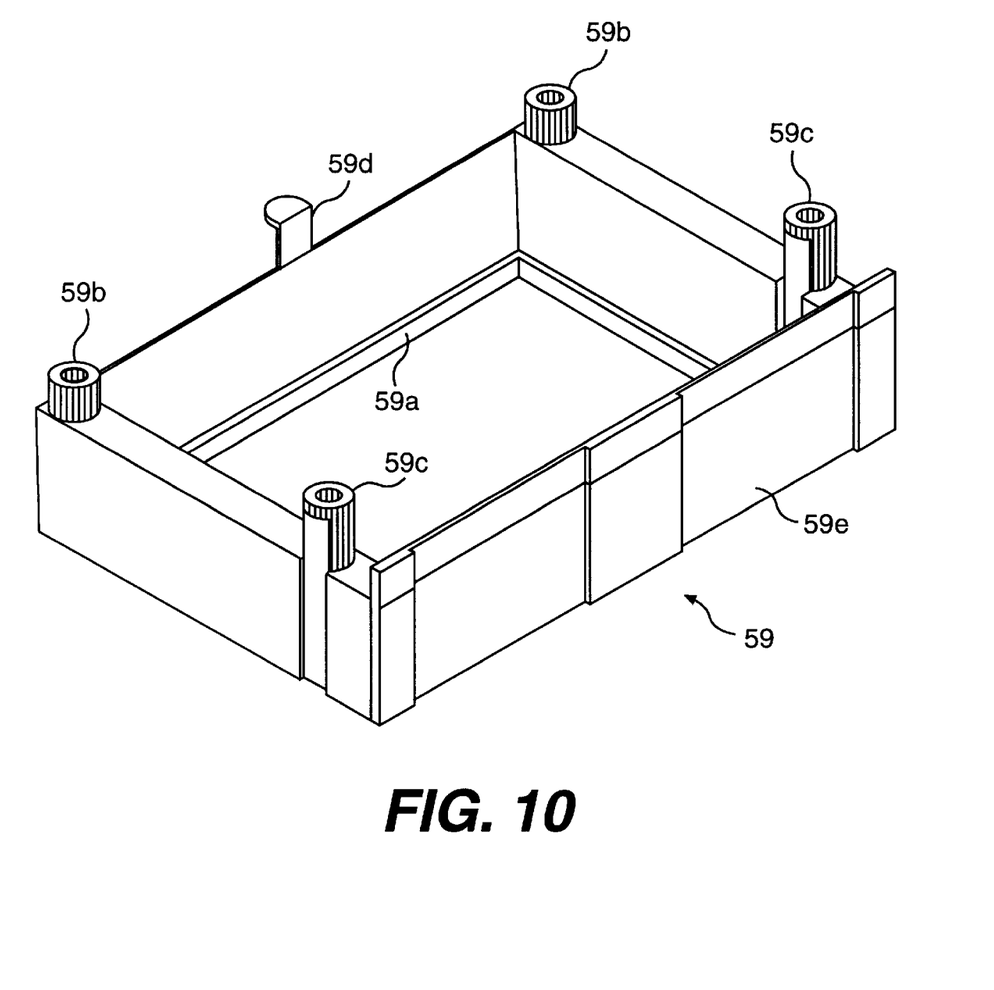
FIG. 10 is a perspective view of a bottom center cup.

FIG. 10 shows details concerning the preferred aspect of center floor support assemblies 56, shown in FIG. 3. FIG. 10 shows bottom center cup 59, in a preferred aspect. Bottom center cup 59 is molded with four walls. The bottom is open with a ridge 59a extending inward from the bottom edge of the walls. At each corner, bottom center cup 59 has cylindrical dowels 59b and 59c extending upward. Dowels 59c are undercut to facilitate connection to wood base 51. In addition, bottom center cup 59 has a tongue 59d extending upward on the back wall to facilitate connection with wood base 51 and further support the assembly. The front wall 59e extends upward along its length at a height greater than the other three walls. The extension of front wall 59e rests against the edge of wood base 51 to provide further support to the center floor support assembly 56.

Figure 11:
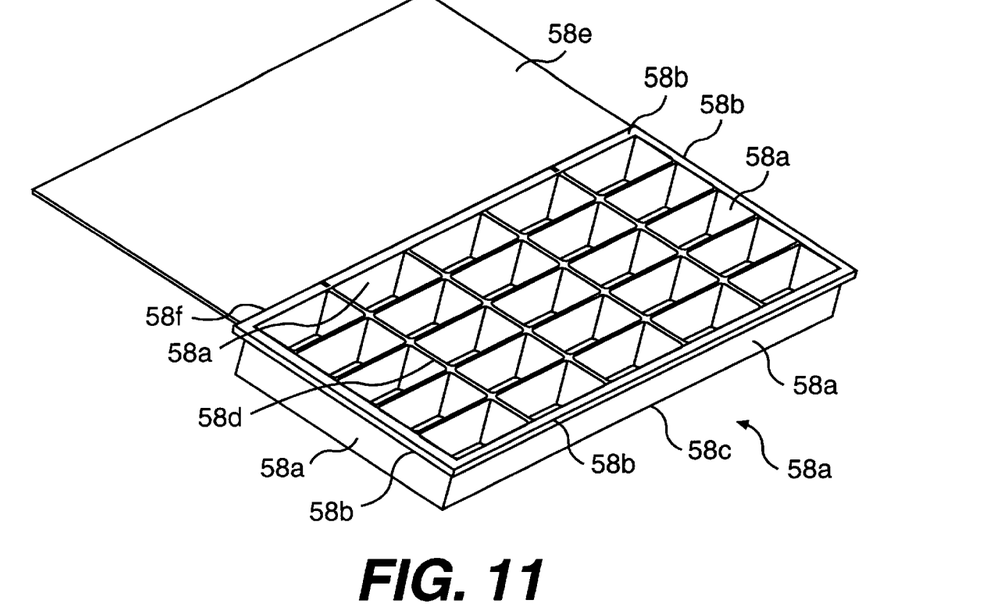
FIG. 11 is a perspective view of a bottom center floor support.

FIG. 11 shows bottom center floor support 58. Bottom center floor support 58 is preferably molded forming vertical walls 58a, ridges 58b around the top perimeter, floor contact surface 58c, stiffening ribs 58d, and lid 58e. Ridges 58b retain bottom center floor support 58 in bottom center cup 59 when the ridges come in contact with the inside ledge created by lower rib perimeter 59a of bottom center cup 59. Lid 58e is molded with a live hinge 58f, along one edge of ridge 58b. Prior to use, lid 58e is folded to cover the top edge of stiffening ribs 58b. Cushioning foam of suitable stiffness or other means, as with the corner support assemblies, is then inserted on top of closed lid 58e. Without lid 58e in place, the cushioning foam would compress into the spaced between the various stiffening ribs 58d.

Figure 12:
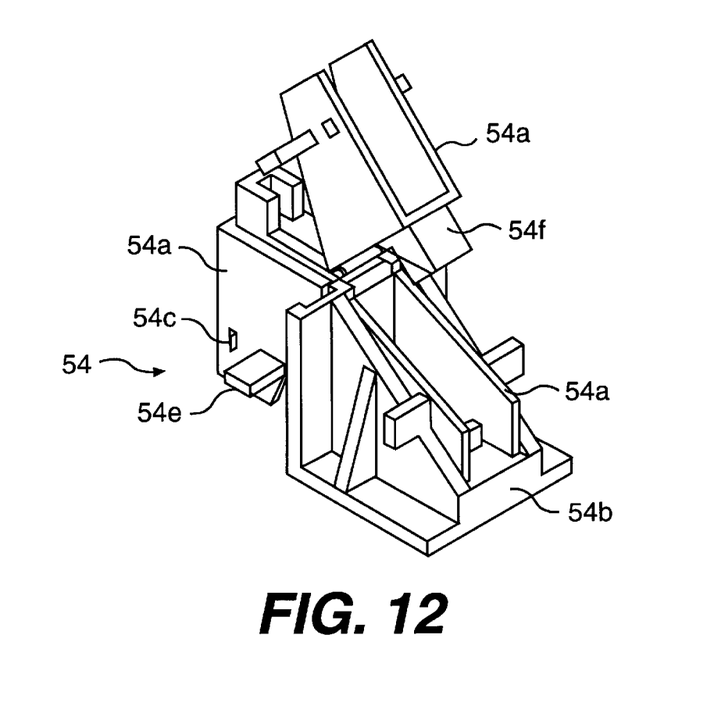
FIG. 12 is a perspective view of a center frame lock.

FIG. 12 shows a center frame lock 54. Center frame lock 54 interlocks undercut dowels 59c, shown in FIG. 10, to secure center floor support assembly 56 to wood base 51. Center frame lock 54 also further secures load 41 in place on wood base 51 by providing a rotatable frame lock member 54a (shown in three positions in FIG. 12), which rotates into engagement with existing holes in load 41. Center frame lock 54 may be molded as a single piece. In this configuration, center frame lock 54 is comprised of frame lock member 54a and base 54b. Rotatable frame lock member 54a preferably has protrusions 54c which lock frame lock member 54a to base 54b upon installation. Frame lock member 54a also preferably has a cantilevered member 54f, which when frame lock member 54a is rotated into position, fits into existing holes in load 41 to help secure load 41 onto wood base 51. Frame lock member 54a preferably has grips 54e to allow the user to engage and disengage the lock. Base 54b is sufficiently reinforced by way of stiffening beams or otherwise to support its functions. The center support assembly 56, comprised in its preferred aspect of bottom center cups 59, bottom center floor supports 58, and center frame locks 54, provides further cushioning to load 41 and further assists in securing load 41 on the cushioned pallet of the present invention. Such center support assemblies 56 are not required for practice of the present invention.

As noted previously, top cap 150, shown in FIG. 2, is preferably comprised of wood top 151 with four corner connectors 152. Corner connectors 152 connect top cap 150 to vertical supports 100 and help secure load 41. Wood cap 151 is of suitable size and thickness for the application. Top cap 150 has a series of positioning holes 154 drilled though the sheet of wood 151 through which corner connectors 152 attach to the sheet of wood 151. Corner connector 152, in turn, is preferably comprised of top locking plate 153 and top dowel plate 155.

Figure 13:
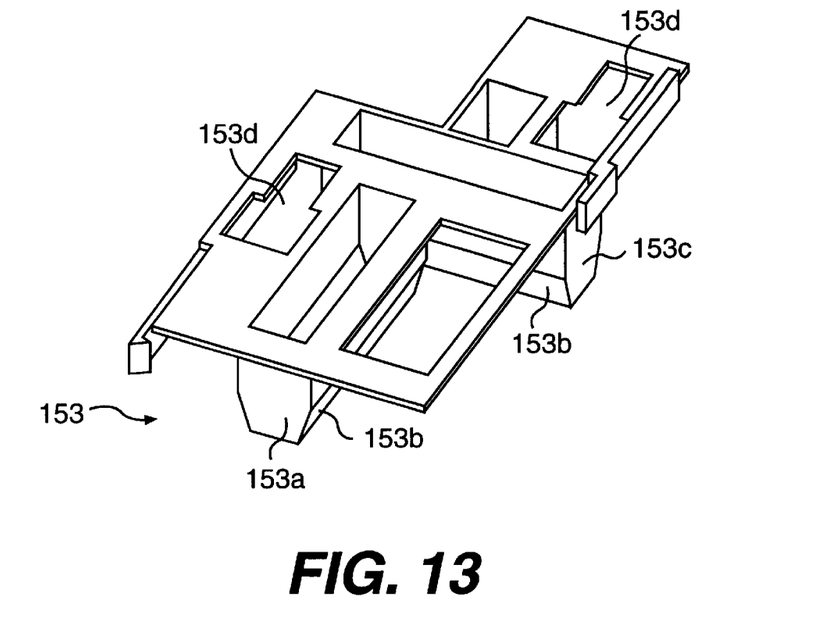
FIG. 13 is a perspective view of a top locking plate.

FIG. 13 shows the preferred form of top locking plate 153. Top locking plate 153 provides a support dome 153a to receive and support vertical support 100. Support dome 153a extends downward from the underside of top locking plate 153 and is beveled at its bottom edge 153b to guide vertical support 100 into place. Top locking plate 153 also provides a load bearing dome 153c to help support load 41. Finally, molded top locking plate 153 preferably includes openings 153d appropriately formed to receive undercut dowels from top dowel plate 155. Undercut dowels in top dowel plate 155 pass through positioning holes 154 drilled in wood cap 151.

Figure 14:
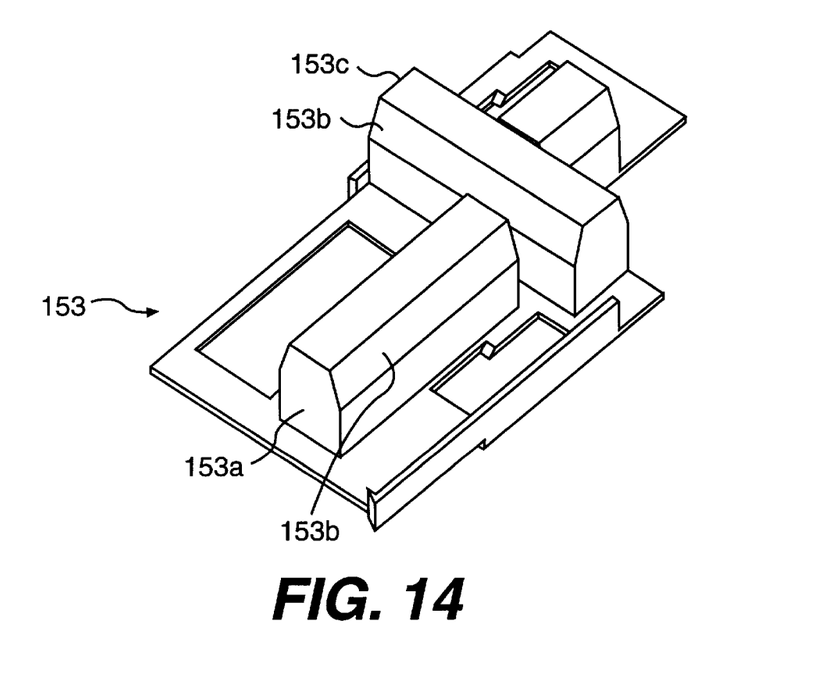
FIG. 14 is a perspective view of the underside of a top locking plate as shown in FIG. 13.

FIG. 14 shows an underside view of top locking plate 153. Support dome 153a and load bearing dome 153c are shown extending down from the bottom of top locking plate 153 with beveled bottom edges 153b to guide load 41 and vertical support 100 into place.

Figure 15:
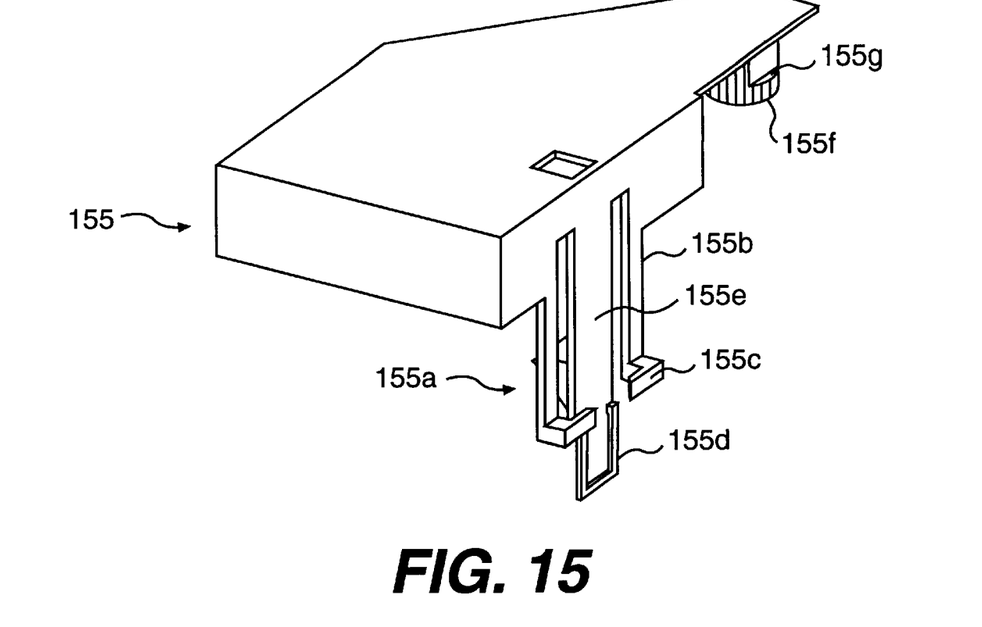
FIG. 15 is a perspective view of a top dowel plate.

FIG. 15 shows the preferred embodiment of top dowel plate 155. Top dowel plate 155 may include molded vertical support lock 155a, molded integrally with top dowel plate 155. Vertical support lock 155a may include a latch member 155b, open position locators 155c, a support loop 155d, and an elongated, flexible member 155e. Latch member 155b preferably extends orthogonally from the end of member 155e. When member 155e is flexed outward it passes outside open position indicators 155c which then restrain member 155e from returning to its engaged position in groove 102 in vertical support 100, shown in FIG. 2. Top dowel plate 155 also preferably includes undercut dowels 155f, which secure corner connector 152 to wood top 151 through holes 154. Cylindrical undercut dowels 155f extend downward from the bottom face of top dowel plate 155 and are molded to form undercut 155g.

Figure 16:
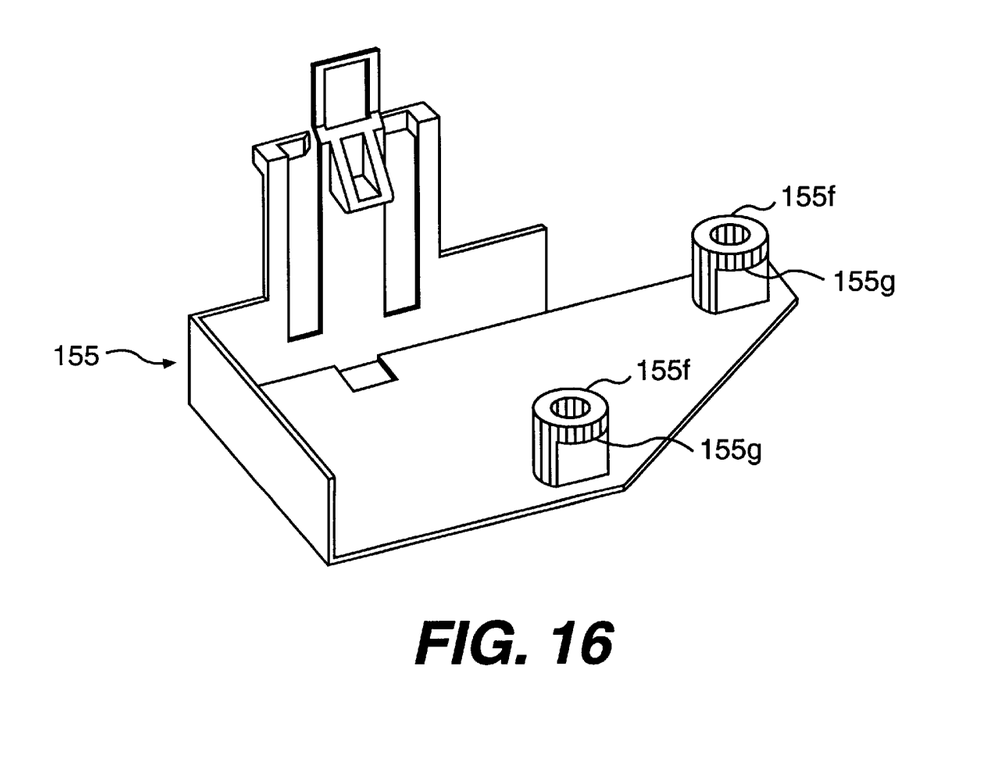

FIG. 16 shows top dowel plate 155 from the bottom. Top dowel plate 155, in a preferred aspect, has undercut dowels 155f, with undercuts 155f.

As can be seen from the foregoing, the present invention utilizes in its preferred aspect molded plastic components that readily snap together. These components can also readily be taken apart for disassembly. These components therefore allow the cushioned pallet of the present invention to be reused, reducing cost and waste, which benefits the environment. Moreover, as can be seen from the foregoing, a number of components are integrated in each component. Therefore, the number of parts is decreased, reducing the cost and labor time associated with the cushioned pallets of the present invention. The various components of the present invention may be made of other materials such as composites or metal. Moreover, the various components of the present invention need not be molded but may be formed by any suitable manufacturing technique.

It will be apparent to those skilled in the art that various modifications can be made in the present invention without departing from the spirit or scope of the invention. Thus, it is intended that the present invention cover the modifications and variations of this invention provided they come within the scope of the appended claims and their equivalents.

What is claimed is:

1. A cushioned pallet for shipping and storage of a load comprising:
    a base support;
    an interconnecting reusable corner support assembly removably interlocked with said base support for cushioning said load and securing said load to said base support;
    a vertical support member removably secured at one end to said corner support assembly;
    a top cap; and
    a reusable top corner interconnecting said vertical support member and said top cap and securing said load, the reusable top corner being removably secured to said vertical support member at the other end of said vertical support member.

2. The cushioned pallet of claim 1 wherein said interconnecting reusable corner support assembly further comprises:
    a bottom corner cup;
    a bottom corner floor support at least partially within said bottom corner cup;
    cushioning material contained at least partially within said bottom corner cup; and
    a bottom corner lock plate removably interlocked with said bottom corner cup.

3. The cushioned pallet of claim 2 wherein said bottom corner cup further comprises a dowel, said dowel extending vertically upward from said bottom corner cup to a notched end, said notched end removably interlocking with said bottom corner lock plate.

4. The cushioned pallet of claim 3 wherein said bottom corner cup further comprises a vertical support lock for removably securing said vertical support member to said interconnecting reusable corner support assembly.

5. The cushioned pallet of claim 4 wherein said bottom corner lock plate further comprises a corner frame lock for removably securing said load to said base support.

6. The cushioned pallet of claim 5 wherein said base support further comprises a suitable material with positioning holes to interlock with said interlocking reusable corner support assembly.

7. The cushioned pallet of claim 1 wherein said reusable top corner further comprises:
    a top dowel plate;
    a top locking plate interlocked with said top dowel plate; and
    a vertical support lock connected to said top dowel plate for securing said vertical support member to said reusable top corner.

8. The cushioned pallet of claim 7 wherein the top cap further comprises a sheet of suitable material with positioning holes to interlock with said reusable top corner.

9. The cushioned pallet of claim 8 wherein said vertical support member further comprises an elongated member with two ends, said elongated member notched at said ends to removably secure said vertical support member to said vertical support lock of said interconnecting reusable corner support assembly at said one end and to said vertical support lock of said reusable top corner at said other end.

10. The cushioned pallet of claim 1 wherein said base support further comprises:

a center support assembly having a center floor support;

at least partially within a bottom center cup;

cushioning material contained at least partially within said bottom center cup; and said bottom center cup removably interlocked with a center frame lock for interlocking said center support assembly to said base support and for removably securing said load to said base support.

11. The cushioned pallet of claim 10 wherein said bottom center cup further comprises a dowel, said dowel extending vertically upward from said bottom center cup to a notched end, said notched end removably interlocking with said center frame lock.

12. An interconnecting reusable corner support assembly comprising:

a bottom corner cup comprising a dowel formed integrally with said bottom corner cup, said dowel extending vertically upward from said bottom corner cup to a notched end, said notched end removably interlocking with a bottom corner lock plate;

a corner floor support within said bottom corner cup;

cushioning material within said bottom corner cup; and a bottom corner lock plate interlocked with said bottom corner cup.

13. The interconnecting reusable corner support assembly of claim 12 wherein said bottom corner lock plate further comprises a corner frame lock for removably securing a load to a base support.

14. The interconnecting reusable corner support assembly of claim 13 wherein said bottom corner cup has a vertical support lock for removably securing a vertical support member to said interconnecting reusable corner support assembly.

15. A cushioned pallet for shipping and storage of a load comprising:

a base support comprising a sheet of suitable material with positioning holes for interlocking with an interconnecting reusable corner support assembly;

said interconnecting reusable corner support assembly removably interlocked with said base support for providing cushioning to said load and securing said load to said base support comprising:

a bottom corner cup;

a bottom corner floor support at least partially within said bottom corner cup;

cushioning material contained at least partially within said bottom corner cup; and a bottom lock plate removably interlocked with said bottom corner cup.

16. The cushioned pallet of claim 15 wherein said base support further comprises:

a center support assembly;

said center support assembly having a center floor support at least partially within said bottom center cup;

cushioning material contained at least partially within said bottom center cup; and said bottom center cup removably interlocked with a center frame lock to interlock said center support assembly to said base support and help secure said load to said base support.

17. The cushioned pallet of claim 16 wherein said bottom center cup further comprises a dowel, said dowel extending vertically upward from said bottom center cup to a notched end, said notched end removably interlocking with said center frame lock.

18. The cushioned pallet of claim 18 wherein said bottom corner cup further comprises a dowel formed integrally with said bottom corner cup, said dowel extending vertically upward from said bottom corner cup to a notched end, said notched end removably interlocked with said bottom corner lock plate.

19. The cushioned pallet of claim 18 wherein said bottom corner lock plate further comprises a frame lock for removably securing said load to said base support.

20. The cushioned pallet of claim 19 wherein said bottom corner cup has a vertical support lock for removably securing a vertical support member to said interconnecting reusable corner support assembly.

* * * * *

UNITED STATES PATENT AND TRADEMARK OFFICE
CERTIFICATE OF CORRECTION

PATENT NO. : 5,970,886
DATED : October 26, 1999
INVENTOR(S) : IMAD KNIO

It is certified that error appears in the above-identified patent and that said Letters Patent is hereby corrected as shown below:

Claim 18, column 12, line 30, change "claim 18" to --claim 15--.

Signed and Sealed this

Fourth Day of April, 2000

Attest:

Q. TODD DICKINSON

Attesting Officer

Director of Patents and Trademarks